United States Patent [19]

Chrisologue

[11] Patent Number: 5,018,476
[45] Date of Patent: May 28, 1991

[54] SLIDING CURSOR CONTROL DEVICE, ESPECIALLY FOR A HEATING AND/OR AIR CONDITIONING INSTALLATION OF AN AUTOMOTIVE VEHICLE

[75] Inventor: Fabrice Chrisologue, Elancourt, France

[73] Assignee: Valeo, Paris, France

[21] Appl. No.: 385,081

[22] Filed: Jul. 26, 1989

[30] Foreign Application Priority Data

Aug. 2, 1988 [FR] France ................. 88 10428

[51] Int. Cl.⁵ .............................................. G09F 11/21
[52] U.S. Cl. .................................... 116/322; 74/566; 116/323; 116/DIG. 14; 200/302.1
[58] Field of Search ................ 74/566; 116/DIG. 14, 116/DIG. 20, 28.1, 278, 281, 283, 322–324; 180/90.6; 200/302.1

[56] References Cited

U.S. PATENT DOCUMENTS

| | | | |
|---|---|---|---|
| 3,115,115 | 12/1963 | Lang et al. | 116/322 |
| 4,565,151 | 1/1986 | Buma | 116/28.1 |
| 4,566,399 | 1/1986 | Hildebrand et al. | 116/28 R |

FOREIGN PATENT DOCUMENTS

| | | | |
|---|---|---|---|
| 0090250 | 10/1983 | European Pat. Off. | 165/42 |
| 0090251 | 10/1983 | European Pat. Off. | 116/28 R |
| 2299676 | 8/1976 | France . | |

*Primary Examiner*—William A. Cuchlinski, Jr.
*Assistant Examiner*—W. Morris Worth
*Attorney, Agent, or Firm*—Dennison, Meserole, Pollack & Scheiner

[57] ABSTRACT

The slidable member of a control device for an automobile heating and/or air conditioning installation extends through a linear opening of a control panel, this opening being obturated by a deformable tape which is fixed at both ends in such a way as to form two terminal loops extending from either end of a central portion of the tape. This central portion is movable longitudinally along the linear opening in the panel, and has a hole through which the slidable member extends, so that when the latter is slid along the opening, the central portion of the tape is moved with it so as to expand one of the loops and contract the other.

11 Claims, 1 Drawing Sheet

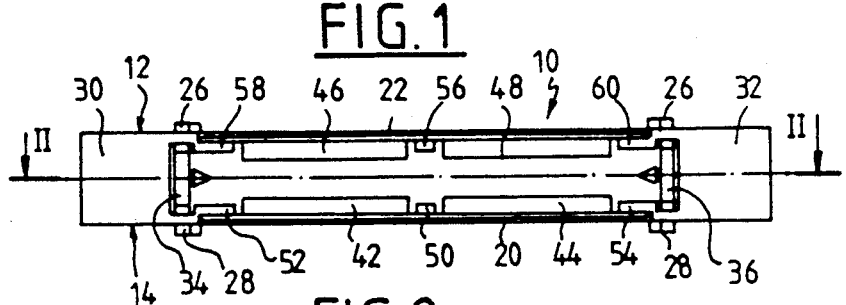
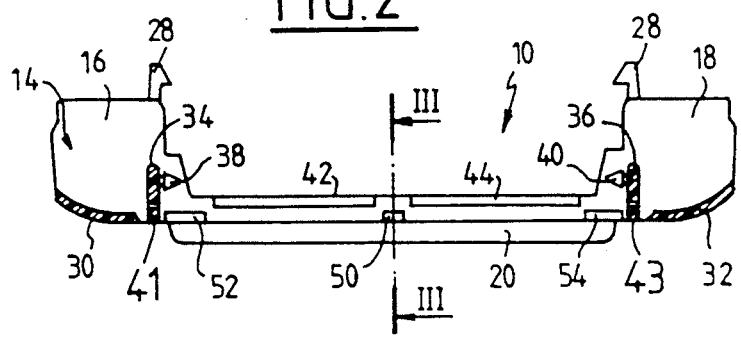
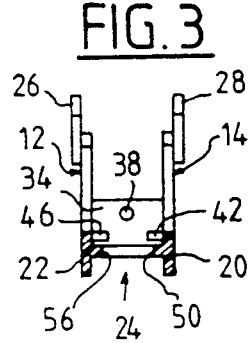
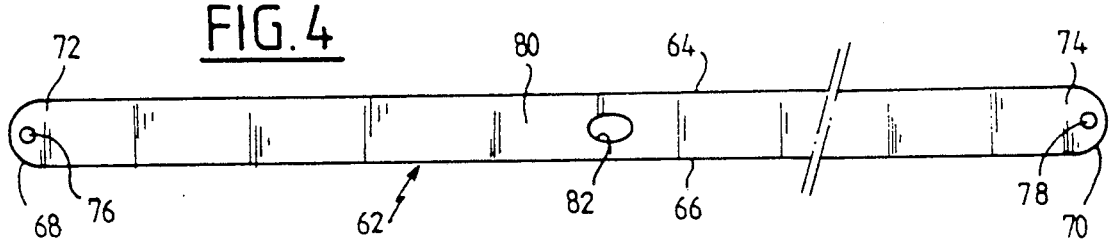
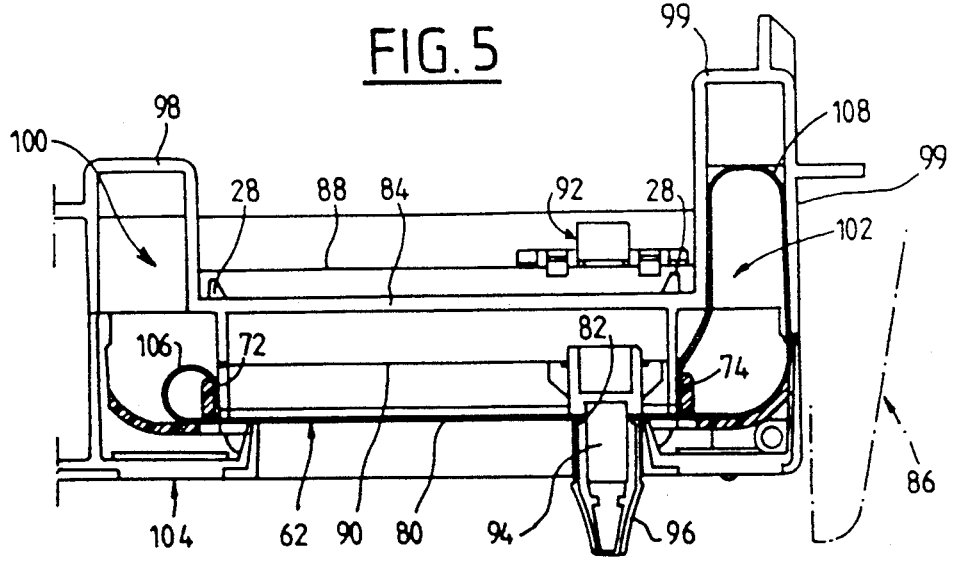

5,018,476

SLIDING CURSOR CONTROL DEVICE, ESPECIALLY FOR A HEATING AND/OR AIR CONDITIONING INSTALLATION OF AN AUTOMOTIVE VEHICLE

FIELD OF THE INVENTION

This invention relates to a control device of the sliding cursor type, especially for a heating and/or air conditioning installation for an automotive vehicle.

BACKGROUND OF THE INVENTION

For controlling certain installations in an automotive vehicle, in particular heating or air conditioning apparatus for the air in the passenger compartment, it is known to use control devices having a slidable member, otherwise known as sliding cursor control devices. In one device of this kind, the slidable member extends through a linear opening, or straight slot, formed in a panel such as the control panel of the particular apparatus to be controlled. The slidable member extends for example from a carrier, or cursor body, having means for guiding the cursor in linear translation movement.

Such devices are usually equipped with some form of lighting, situated behind the panel, so that the driver can see at night the different positions to which the slidable member can be moved. In order to prevent parasitic light from the lighting means escaping through the linear opening along which the cursor slides, it has been proposed that a flexible tape be provided to cover the opening in all positions of the slidable member. Such a tape allows the mechanism which would normally be visible through the opening to be hidden.

This tape does however have the disadvantage that it requires a substantial amount of free space to be provided on either side of the control panel, so as to accommodate the tape as the latter is moved along the linear opening when the cursor is moved.

U.S. Pat. No. 4,566,399, and European Patent Publication EP 0090250 A, propose ways of overcoming this disadvantage. However, these known solutions are not satisfactory, notably because the tape which covers the linear opening also sets up friction which hinders the displacement of the slidable member and renders control rather rough and uncomfortable for the operator.

SUMMARY OF THE INVENTION

An object of the invention is to provide a control device which does not have the above mentioned disadvantages.

According to the invention, a control device of the sliding cursor type, of the kind defined above, is such that the tape is fixed at both ends in such a way as to define two terminal loops whereby a central portion of the tape is extended, the central portion being adapted to move longitudinally in relation to the linear opening, with a hole, to accommodate the slidable member of the cursor, being formed in the central portion of the tape in such a way that displacement of the slidable member also causes corresponding displacement of the central portion of the tape, so as to expand one of the terminal loops and contract the other.

Such a tape sets up virtually no friction on the sliding member as the latter is moved along the linear opening. In addition, this arrangement has the advantage of being especially easy to manufacture.

The tape is preferably carried by a module adapted to be fixed to the panel, for example by means of snap fit teeth. This module can thus be easily fitted on the panel after having been assembled with its cursor.

The control panel preferably comporises walls defining two housings in which the two terminal loops of the tape are respectively received, each housing being preferably so oriented as to direct the corresponding terminal loop in a preferential direction. In this way, the "excess" of tape which is produced when a terminal loop expands can be guided in an orientation such that the loop, instead of being generally circular in shape, is elongated in a preferred principal direction. The result of this is that the excess of tape can be confined within a housing which is smaller in, for example, the plane of the linear opening along which the cursor slides. The excess tape can be guided in whatever direction is desired.

In one preferred form of the invention, the module comprises two spaced apart parallel walls defining the slot or linear opening between them. These two walls preferably include guide means for the tape, the guide means being on faces of the said walls which are directed towards each other, and the guide means extending over the whole length of the linear opening.

In the description which follows, which is given by way of example only, reference will be made to the accompanying drawings.

BRIEF DESCRIPTION OF THE DRAWINGS

FIG. 1 is a front view of a module forming part of a control device according to the invention.

FIG. 2 is a view taken in cross section on the line II—II in FIG. 1.

FIG. 3 is a view in cross section taken on the line III—III in FIG. 2.

FIG. 4 is a fron view of the tape which is used in the module shown in FIGS. 1 to 3.

Finally, FIG. 5 is a partial view in cross section, through a panel which is provided with a control device having a cursor together with a module of the kind shown in FIGS. 1 to 3.

DESCRIPTION OF PREFERRED EMBODIMENT OF THE INVENTION

The module 10, of the kind shown in FIGS. 1 to 3, comprises a single member moulded in plastics material, and includes two walls 12 and 14, generally of the same configuration as each other. The walls 12 and 14 are spaced apart and extend parallel to each other. Each of these walls, for example the wall 14 (FIG. 2), comprises two end portions 16 and 18 which are connected together by an intermediate portion 20 which is generally rectangular. The intermediate portion 20 extends parallel to a corresponding intermediate wall portion 22 which forms part of the wall 12.

The intermediate wall portions 20 and 22 define between them an elongated, rectangular slot or linear opening 24, which extends over the whole length of the wall portions 20 and 22. The length of the opening 24 corresponds substantially to the distance separating the end wall portions of the wall 14 and the corresponding end wall portions of the wall 12.

The wall 12 has two snap fit teeth 26, and the wall 14 has two snap fit teeth 28. These four teeth are adapted to allow the module 10 to be mounted in a panel, for example a control panel of an automotive vehicle, by being snapped into position. The walls 12 and 14 are connected together by two front walls 30 and 32, which are curved slightly inwardly, with the wall 30 connecting the end portion 16 of the wall 14 with the corresponding portion of the wall 12, while the wall 32 similarly connects the wall portion 18 of the wall 14 with the corresponding portion of the wall 12. In addition, the walls 12 and 14 are connected together by means of two transverse bulkheads 34 and 36, which are located close to the front walls 30 and 32 respectively. The bulkhead 34 connects the portion 16 of the wall 14 with the corresponding portion of the wall 12, while the bulkhead 36 connects the portion 18 of the wall 14 with the corresponding portion of the wall 12. The bulkheads 34 and 36 are arranged parallel with each other, and are spaced apart by a distance corresponding substantially to the length of the opening 24. The bulkhead 34 carries a small peg 38, which is located part way up its height and in opposed relationship with another similar peg 40 which is provided in the same way on the bulkhead 36.

The front wall 30 and the bulkhead 34 define between them a generally rectangular passageway 41, the height of which corresponds to the distance separating the walls 12 and 14 from each other. In the same way, the front wall 32 and the bulkhead 36 define between them a generally similar rectangular passageway 43.

Two ribs, 42 and 44, project from the intermediate portion 20 of the wall 14. The ribs 42 and 44 are aligned with each other endwise, and lie facing, respectively, two more ribs 46 and 48 which project from the intermediate portion 22 of the wall 12. Three further ribs 50, 52 and 54 similarly extend from the intermediate wall portion 20, and lie facing three similar ribs 56, 58 and 60 respectively. The ribs 56, 58 and 60 project from the intermediate wall portion 22, with the rib 50 extending into the space separating the ribs 42 and 44 from each other, while the ribs 52 and 54 are situated beyond the outer ends of the ribs 42 and 44.

The ribs 42, 44, 50, 52 and 54 together, and the ribs 46, 48, 56, 58 and 60 together, define two respective slideways which therefore lie facing each other as can be seen in FIG. 3. These slideways act as guides for a flexible tape 62 (FIG. 4) which obturates the opening 24.

The tape 62 may for example be made of a flexible plastics material and is generally rectangular, being limited by two parallel edges 64 and 66 which are joined at their ends by rounded edges 68 and 70. The width of the tape 62 is slightly smaller than the internal distance separating the walls 12 and 14 of the module 10. In the vicinity of the ends 72 and 74 of the tape 62, two holes 76 and 78 are formed: the tape is attached by means of these holes to the pegs 38 and 40 of the module 10. The tape also has a hole 82 in its central portion 80: the hole 82 is substantially elliptical and accommodates a slidable actuating member as will be described below:

The tape 62 is fixed, at its end 72, on the peg 38 and is then looped so as to provide a first terminal loop 106 (FIG. 5) located between the portion 16 of the wall 14 and the corresponding portion of the wall 12. From there it extends through the passageway 41 to be guided by the slideway described above defined by the various ribs, from which it extends through the passageway 43. Beyond the latter the tape is again looped, so as to form a second terminal loop 108, FIG. 5, lying between the portion 18 of the wall 14 and the corresponding portion of the wall 12. Finally, the tape is fixed at its end 74 on the peg 40. The tape 62 is thus mounted in the module 10 in such a way as to form with the latter a kind of cassette.

As can be seen from FIG. 5, the module 10, with the tape 62 mounted in it, is fitted, by means of the snap fitting teeth 28, on a wall 84 which extends from the control panel 86 of an automotive vehicle. Two slideways 88 and 90, which act as guides for the linear movement of a cursor generally indicated at 92, project from, and on either side of, the wall 84. From the body or carrier of the cursor 92 there projects a slidable member 94 which is part of the cursor and which extends through the opening 24 of the module 10. The member 94 is slidable along the entire length of the opening 24. The projecting member 94 extends through the hole 82 in the tape 62 and carries a finger-engaging sleeve 96, which is snapped onto the projecting member so as to form with it a manual operating button.

The wall 84 is extended by further walls 98 and 99, which define, respectively, two housings 100 and 102. These housings are generally elongated in a principal direction which extends perpendicularly to the frontr face 104 of the control panel 86. The terminal loops 106 and 108 of the tape 62, which constitute extensions of the central portion 80 of the tape, are contained respectively in the housings 100 and 102. When the sliding actuating member, in this example comprising the projecting member 94 with its sleeve 96, is moved parallel to the slideways 88 and 90, it carries the central portion 80 of the tape with it in linear movement, the central portion 80 being guided by the ribs 42 and 44 to 66; this causes the loops 106 and 108 to be deformed since their respective ends 72 and 74 are fixed within the module 10. When, as is shown in FIG. 5, the sliding member 94, 96 occupies the extreme right hand position as seen in this Figure, the loop 108 is fully expanded, while the loop 106 is fully contracted. The loop 108 is then confined within the housing 102 and its shape is dictated by the walls 99 of that housing, so that the principal dimension of this loop is generally perpendicular to the front face 104 of the fascia. The loop thus occupies less space, as seen from the front, than would be the case if it were free and thus assumed a generally circular shape.

When the slidable member 94, 96 is displaced towards the extreme left hand position as seen in FIG. 5, the loop 106 becomes fully expanded and is then confined by the walls of the housing 100, the loop 108 then being fully contracted.

The device as shown in FIG. 5 may be provided with suitable lighting means (not shown), so that the various positions to which the sliding member 94, 96 of the cursor can be moved may be seen at night. The tape 62 is preferably made of an opaque black material, thus preventing any escape of parasitic light through the opening 24 of the module 10.

In a modification, the tape 62 can be formed of a translucent material, and may for example have different portions of different colours, with different indications or symbols then being revealed by the translucent portion of the tape. For example, in the case in which the sliding cursor is arranged to regulate air temperature for heating the air in the passenger compartment of the vehicle, the tape can include one region coloured blue and another region which is coloured red. These regions would then normally extend respectively to either side of the central hole 82.

In the arrangement shown in FIG. 5, the cursor 92 is connected so as to control, for example by means of a cable, a suitable member forming part of the equipment of the vehicle, for instance an operative member of a heating or air conditioning installation for the passenger compartment.

What is claimed is:

1. A slider arrangement to prevent light leakage from a control panel comprising: a panel defining a linear opening therethrough; a slidable control member; means mounting the slidable member with said slidable member extending through said linear opening; an elongated resilient tape; means slidably mounting the tape adjacent the linear opening so as to obturate said linear opening in any position of the slidable member along the linear opening, the tape comprising a central portion and two end portions extending respectively on either side of the central portion, with the central portion having a through opening and the slidable member extending through said through opening; and means mounting the two said end portions of the tape so as to define two terminal loops of the tape, whereby on displacement of the slidable member along the linear opening, the tape moves along the opening while extending one of said terminal loops and contracting the other one.

2. A device according to claim 1, further comprising a module, the module including means mounting the tape within it and means for fixing the module to the control panel.

3. A device according to claim 2, wherein the means for fixing the module to said control panel comprise snap fit teeth.

4. A device according to claim 2, wherein said control panel comprises walls defining two housings, each terminal loop of the tape being mounted in communication with a respective one of said housings whereby to expand respectively into it.

5. A device according to claim 4, wherein the walls defining said housings are so disposed that each said housing is oriented in such a way as to direct the extention of each respective said terminal loop of the tape in one preferential direction.

6. A device according to claim 2, wherein said module comprises two spaced apart parallel walls defining said linear opening between them.

7. A device according to claim 6, further including guide means formed on said spaced apart parallel walls of the module and mounted on the opposed faces of said parallel walls, said guide means extending over the entire length of said linear opening whereby to guide the central portion of the tape.

8. A device according to claim 6, wherein the module further comprises two transverse bulkheads connecting said two spaced apart parallel walls together, and a securing member carried by each said transverse bulkhead, a respective said end portion of the tape being secured to each said securing member.

9. A device according to claim 1, wherein the tape is of a material selected from black plastics material.

10. A device according to claim 1, wherein the tape is of a translucent material having means distinguishing different regions thereof from each other, said means being selected from different colours, marks, and symbols.

11. A device according to claim 1, wherein the tape is selected from opaque flexible materials.

* * * * *